United States Patent Office 3,337,247
Patented Aug. 22, 1967

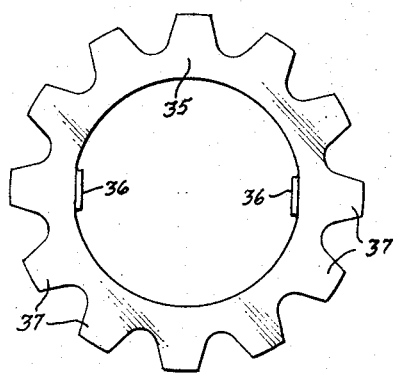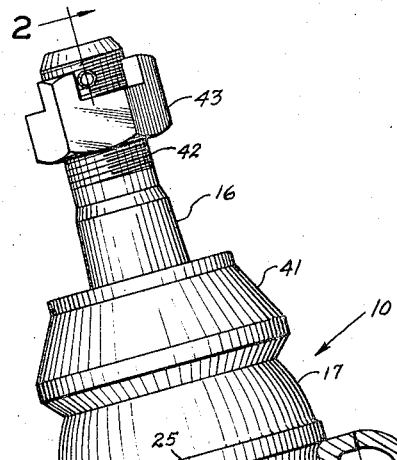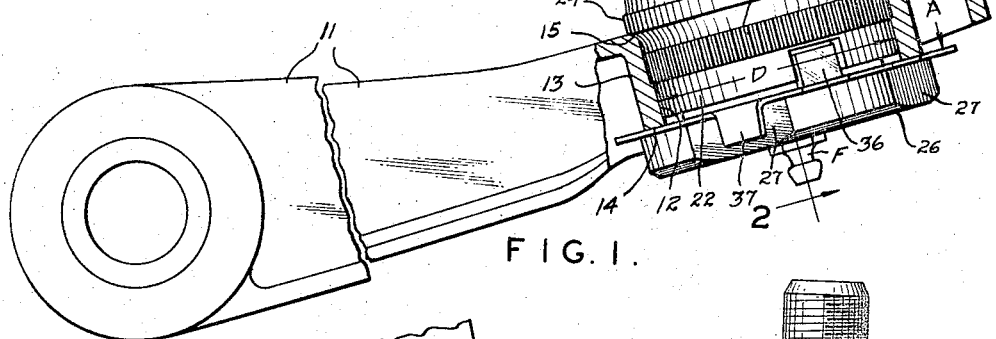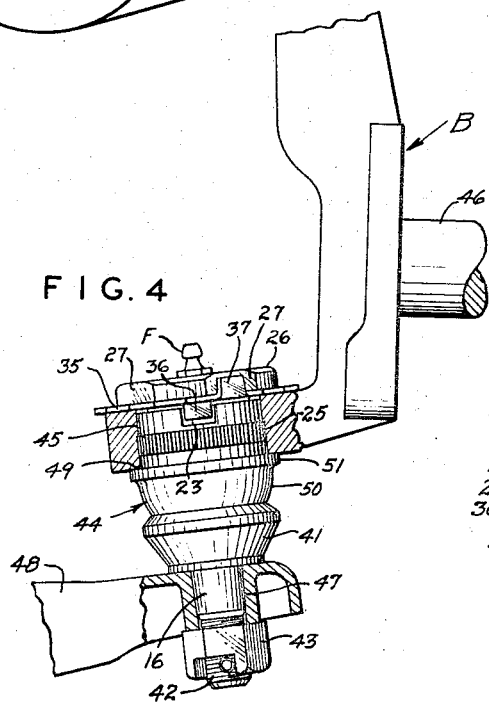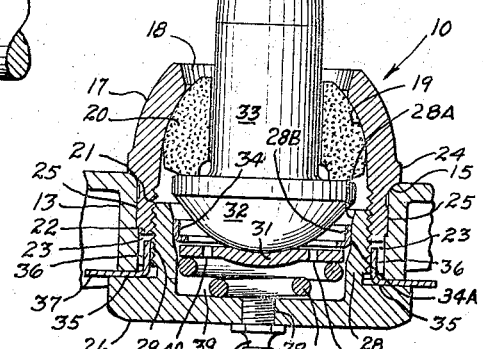
INVENTOR.
MILTON A. MOSKOVITZ

3,337,247
BALL JOINTS
Milton A. Moskovitz, Richmond Heights, Mo.
(855 Scott St., Murfreesboro, Tenn. 37130)
Filed June 22, 1961, Ser. No. 144,278
(Filed under Rule 47(b) and 35 U.S.C. 118)
2 Claims. (Cl. 287—90)

This invention relates to ball joints, and more particularly to a ball joint having detachably assembled parts which lock together when installed in a vehicle wheel suspension system.

The invention has among its objects a construction in which the ball joint unit is composed of at least two principal parts which are cooperatively joined and locked together in a mounting eye in the vehicle suspension system.

It is also an object of this invention to improve upon the construction of ball joints which are generally referred to as cartridge units by providing cooperating subassemblies which contain in proper position all of the requisite components of the final assembly, whereby the improved unit may be quickly and easily connected together in an eye of a wheel suspension arm by threading the parts together to clamp into the eye from opposite sides of the arm.

It is a further object of this invention to simplify the manufacture of ball joints into two cooperating parts and to adapt the two parts to accommodate variations in the thickness of the mounting eye portion of a wheel suspension control arm, as well as to accommodate variations in diameter of the mounting eye such that the assembled unit will result in its adaptation to original equipment or replacement use.

It is still a further object of this invention to provide an improved ball joint assembly in which the major part of the load imposed thereon is substantially restricted to a part of the housing for the assembly which can be economically manufactured to provide the necessary strength as well as to allow flexibility in providing hardness where the same is required, all of which results in certain economies of manufacture and improves the range of utility of the ball joint.

A preferred form of invention, hereinafter to be described, comprises a body to contain the usual headed stud and stud bearing, and a cap for the body in which the cap is utilized as a carrier for a rebound tension assembly which cooperates with the head of the stud to compensate for wear and to prevent rattle or undesirable movement of the stud and bearing during wheel rebound motion. The preferred form of the invention also comprises the construction of a two-part ball joint assembly in which the two parts are cooperatively joined or connected in a manner to take care of variations or manufacturing tolerances in axial length of the mounting eye in vehicle wheel suspension control arms or the like, all of which assembly does not adversely affect the desirability of maintaining tension on the stud head by the means mounted in the cap.

The invention also consists in the novel form, arrangement, construction and combination of parts herein described and shown in the accompanying drawings wherein:

FIG. 1 is an elevational view of the preferred ball joint mounted in a control arm, the control arm being shown in fragmentary section;

FIG. 2 is a sectional elevational view of the ball joint as seen along line 2—2 in FIG. 1;

FIG. 3 is a plan view of the locking means for the ball joint of FIG. 1; and

FIG. 4 is a fragmentary and partly sectioned view of a modified form of ball joint mounted in a member of a vehicle wheel suspension system differing from that shown in FIG. 1.

Referring to the drawings there is illustrated in FIG. 1 a preferred embodiment of the ball joint 10 mounted in the lower one of the control arms 11 of a conventional wheel suspension system. The arm 11 is shown in section to have an eye 12 formed by the material of the arm being drawn into a cylindrical flange 13 having a lower free end 14 and an upper seat end defined by a radius 15. The ball joint assembly 10 is mounted in the eye 12 in a position in which the load is in tension on the projecting stud shank 16, since shank 16 is adapted to be connected to another part of the suspension system, such as the wheel spindle bracket B (FIG. 4) supported by the usual vehicle wheel (not shown).

Referring now in detail to FIG. 2 and to other views in the drawings, the ball joint assembly 10 is seen to include a body 17 forming a housing for the internal parts of the assembly and having an opening 18 through which the stud shank 16 projects, the opening 18 being formed through a semispherical seat 19 on which a suitable sintered metal or other bearing element 20 is mounted. The body 17 is provided with an axially extending portion having internal threads 21 which extend outwardly from the bearing seat 19 to the open end 22 of the axially extending portion. As spaced points around the circumference of the open end of the body housing there are provided axially directed slots 23, two such slots being shown in FIG. 2. The body 17 has an external annular rib 24 intermediate its ends, the rib 24 constituting an enlarged portion having a diameter which is too large to pass through the diameter of the eye 12 in the control arm 11. Adjacent rib 24 the body 17 is provided with a peripherally extending band of straight knurling 25 whereby the body may be frictionally gripped within the eye 12 of the control arm 11 by pressing or pushing the body into such eye until the shoulder formed by rib 24 seats on the entrance radius 15 of the eye.

The cooperating parts of the ball joint assembly (FIG. 2) include a cap 26 which has an enlarged wrench head formed with tool engaging flats 27 on its periphery. The cap head is made too large to pass through the eye of the arm. The cap 26 is further formed with an axially extending portion 28 having external threads 29 which are adapted to engage with the internal threads 21 in the body 17. The cap 26 is internally hollow to provide a recess for the mounting of a spring or resilient loading means 30 which bears upon a hardened wear plate 31 adapted to engage on the head 32 of the usual stud 33. The wear plate 31 is provided with an indentation to provide a suitable surface engaged with the stud head 32 for relative movement. The resilient loading means 30 and wear plate 31 are suitably retained in the cap 26 by a press fitted retainer ring 34 which engages the wear plate 31 at its circumferential margin when the cap 26 is not threaded into the body 17. For this purpose the hollow cap 26 has its extension 28, as shown in FIG. 2, formed with a bore having a slightly tapered entrance 28A leading into a cylindrical portion 28B adjacent thereto. The press fitted retainer ring 34 has a cylindrical outer periphery 34A which is slightly larger in diameter than the diameter of the cylindrical portion 28B so that the press fit is obtained and results in a compressive hoop stress in the ring 34 great enough for holding the wear plate 31 against the compression of the resilient loading means 30. Other retainer means might be utilized, but it is preferred to make use of a press fitted type retainer whereby the expense of assembling the parts in the internal recess in the cap 26 may be more economically achieved. It is also possible with sliding press fit of the retainer 34 to prelocate the same so that the initial compression on means 30 can be selected to provide a desired initial load on the stud head 32 and to allow some adjustment for wear.

Comparing the several views of the drawing it may be seen that the body 17 of the ball joint 10 is adapted to be press fitted or pushed into the control arm eye 12 so that it will be retained therein by the knurling 25 biting into or otherwise gripping the walls of the flange 13. The body 17 is properly located by the shoulder 24 engaging on the radius 15 at the entrance to the eye 12. Before the cap 26 is threaded into position a lock ring or safety washer 35 is placed over the eye 12 such that internally projecting tabs 36 seat in the axial slots 23. The washer 35 is provided with a series of outwardly projecting tabs 37 which normally lie adjacent the end 14 of flange 13 of the control arm 11. The cap 26 with its resilient loading means positioned therein is threadedly engaged in the body 17 and may be screwed down until the enlarged head 26 abuts the safety washer 35. The cap 26 is threaded up tight to securely retain the body 17 in its intended position. Cap 26 is thereafter secured against unthreading action by any one or more of the outwardly projecting tabs 37 being bent outwardly as shown in FIG. 1 to engage the flats 27 thereon.

It will be observed in FIG. 2 that a clearance space is formed between the retainer ring 34 and the resilient means 30. This is desired so that the means 30 is yieldingly movable and, therefore, capable of urging the wear plate 31 against the stud head 32 without contacting the ring 34. The clearance space also permits wear plate 31 to ride upon the head 32 whether the axial length of eye 12 is longer or shorter than a certain mean dimension. This takes into account production tolerances and manufacturing variations that may develop in the part 11.

The internal working members of the ball joint assembly are suitably lubricated by providing cap 26 with a grease hole 38 which may be closed by a plug or which may be provided with a suitable lubricant fitting F. The grease deposited in the cap space 39 passes through the wear plate 31 through perforations 40 to reach the stud bearing 20. The opening 18 of the ball joint assembly 10 is covered by a suitable boot or seal 41 of resilient material which encircles the opening 18 and is tightly fitted on the projecting shank 16. The outer end of shank 16 is provided with a suitable threaded end 42 and nut 43 to enable it to be connected to an adjacent member of the wheel suspension system.

Turning now to FIG. 4, the modified ball joint 44 is illustrated as mounted in an eye 45 of spindle bracket B, the spindle bracket carrying the vehicle wheel upon the spindle 46. In the view shown, the eye 45 is the lower one of a pair of such means on the bracket B, the upper eye not being shown. The ball joint assembly 44 is intended to operatively connect the eye 45 on bracket B to an eye 47 in a lower control arm 48. The control arm 48 may be similar to control arm 11 shown in FIG. 1. It is particularly pointed out that the eye 45 in the spindle bracket B is formed without a radius at the entrance 49. Therefore, the ball joint 44 has its body 50 formed with the shoulder 51 squared off so as to match with the entrance end 49 and provide a complementary surface for the proper fitting of the ball joint in the eye 45. In other respects the ball joint 44 is similar to the ball joint 10 of FIG. 1 and similar reference numerals are applied where the parts are similar.

From the foregoing description of a preferred embodiment of the invention it may be seen that the threadedly engaged body 17 and cap 26 are adapted to accommodate variations in the axial length of the eye 12 in the control arm (or eye 45 in bracket B) such dimension being denoted in FIG. 1 at A. A variety of variations in dimension A is accommodated thereby without seriously affecting the resilient tension loading means 30 since the means 30 will be more or less compressed depending on the differences in dimension A. Furthermore, the knurling 25 on the body 17 (or on body 51 of FIG. 4) will accommodate a range of variations in the dimension D depicted in FIG. 1 for the diameter of the eye 12 in the control arm 11 (or the diameter of eye 45 in bracket B). What has been suggested for the control arm 11 which is usually formed as a pressed metal part applies equally well to the spindle bracket 45. However, it is possible to obtain more refined production dimension control for the spindle bracket B since this is usually a forged part.

It should now be understood and appreciated that the embodiment of the invention herein disclosed is fully able to fulfill all of the objects stated therefor, and it will be appreciated that the invention is susceptible of modification, variation or change in one or more of its parts and components, without departing from the spirit of the invention and the scope of the appended claims.

What is claimed is:

1. A ball joint assembly for mounting in an eye of a vehicle wheel suspension part from the opposite sides of the eye, said assembly including a body having a seat surface therein adjacent an opening, a stud having an enlarged head rotatably and tiltably mounted in said body upon said seat surface, said stud having a shank portion projecting through said opening, said body having an enlarged external shouldered portion too large to pass through the eye of the suspension part and an extension on said body projecting into the eye, a cap for said body formed with an end too large to pass through the eye of the suspension part and an extension on said cap projecting into the eye, said extension having a bore with a slightly tapered entrance and a cylindrical portion adjacent thereto, said body and cap extensions having means therein to connect and cooperatively secure said body and cap in the eye of the suspension part from the opposite sides thereof, and means pre-assembled in operative position in said cap to exert a load upon said stud, said means including a resilient member, a wear plate engaged by said resilient member, and a retainer ring element having a cylindrical outer periphery slightly larger in diameter than the diameter of said cylindrical portion adjacent to said tapered entrance and press fitted into said cap against said wear plate to retain said wear plate and resilient member in a pre-positioned setting under an initial load from said resilient member so as to impose a compressive hoop stress in said retainer ring greater than the compressive force of said resilient member on said wear plate, said ring exposing a portion of said wear plate for engagement by said enlarged head projecting through said ring in the assembly of said cap and body from the opposite sides of the suspension part, said wear plate being moved by said enlarged head away from said ring to increase the loading on said wear plate by said resilient member.

2. A ball joint assembly for mounting in a vehicle wheel suspension part from the opposite sides of an eye opening in such part, the ball joint assembly including a housing providing an internal socket having a constricted end portion forming a load bearing surface and an opposite open end having internal threads, a shoulder formed on the external surface of said housing between said ends and engaged against a periphery of the eye opening at one side of the suspension part to limit the extent of insertion of said opposite open end of said housing into the eye opening, a stud having an enlarged head rotatably and tiltably mounted in said housing and bearing on said load bearing surface, said stud having a shank extending through said constricted end portion, a cap member for said housing socket having a head too large to pass through the eye opening and an extension projecting from said head formed with external threads engageable with said internal threads in said housing socket to clamp said housing in the eye opening between said enlarged head and said shoulder, said cap member extension having a bore formed with a slightly tapered entrance portion and a cylindrical portion inwardly adjacent thereto, and stud head loading means preassembled in position in said cap member, said loading means including a resilient member in said cylindrical portion of said cap member, a plate element engaged on said resilient member and formed with a surface to engage on said stud head, and a retainer ring element of annular form having a cylindrical outer periphery slightly larger in diameter than the diameter of said cylindrical portion and being press fitted into said cylindrical portion through said tapered entrance portion, said ring element sliding into position under a compressive hoop stress greater than the compressive force exerted by said ring element through said plate element upon said resilient member to retain said plate element and resilient member within said cap in a compressed position permitting initial threading of said cap into said housing socket, continued threading of said cap into said housing to clamp the eye opening between said shoulder and said cap head causing said plate element to bear upon said stud head and lift off said retainer ring to transfer the compressive force of said resilient member from said retainer ring to said stud head.

References Cited

UNITED STATES PATENTS

| | | | |
|---|---|---|---|
| 670,359 | 3/1901 | Jenkins | 151—53 |
| 1,697,784 | 1/1929 | Seaholm. | |
| 1,797,893 | 3/1931 | Zerk. | |
| 2,023,898 | 12/1935 | Olson | 308—36.2 |
| 2,071,341 | 2/1937 | Hufferd et al. | 287—90 |
| 2,203,525 | 6/1940 | Dupree | 308—36.2 |
| 2,288,164 | 6/1942 | Katcher | 277—85 |
| 2,291,945 | 8/1942 | Dupree | 277—86 |
| 2,607,615 | 8/1952 | Katcher | 277—87 |
| 2,645,510 | 7/1953 | Booth | 287—90 |
| 2,786,423 | 3/1957 | Coffey | 103—150 |
| 2,864,628 | 12/1958 | Edleson | 284—18 |
| 2,876,030 | 3/1959 | Booth | 287—90 |
| 2,953,401 | 9/1960 | Moskovitz et al. | 287—90 |
| 3,056,617 | 10/1962 | Snoddy | 285—341 |

FOREIGN PATENTS

| | | |
|---|---|---|
| 630,181 | 5/1936 | Germany. |
| 184,329 | 8/1922 | Great Britain. |
| 220,237 | 8/1924 | Great Britain. |

OTHER REFERENCES

1957 Oldsmobile Shop Manual, published for Service Department, Oldsmobile Division, General Motors Corp., Lansing, Mich., copy available in Group 350, pages 228 and 231 relied on.

CARL W. TOMLIN, *Primary Examiner.*

A. V. KUNDRAT, *Assistant Examiner.*